United States Patent [19]

Schneider

[11] Patent Number: 5,269,496
[45] Date of Patent: Dec. 14, 1993

[54] AIR SPRING HAVING AN ELASTOMERIC AIR-SPRING FLEXIBLE MEMBER

[75] Inventor: Eckhard Schneider, Lehrte, Fed. Rep. of Germany

[73] Assignee: Continental Aktiengesellschaft, Hanover, Fed. Rep. of Germany

[21] Appl. No.: 989,977

[22] Filed: Dec. 11, 1992

[30] Foreign Application Priority Data

Dec. 13, 1991 [DE] Fed. Rep. of Germany ....... 4141156

[51] Int. Cl.⁵ .................... B60G 11/28; F16F 9/54
[52] U.S. Cl. .................... 267/64.27; 267/122
[58] Field of Search ............ 267/122, 64.11, 64.19, 267/64.27, 64.23, 64.24, 64.21; 185/18 A; 92/98 R, 103 R; 280/711

[56] References Cited

U.S. PATENT DOCUMENTS

4,456,308 6/1984 Opel et al. ................. 188/18 R
4,798,369 1/1989 Geno et al. ................. 267/122 X

FOREIGN PATENT DOCUMENTS

1285792 12/1968 Fed. Rep. of Germany .

OTHER PUBLICATIONS

"Taschenbuch Maschinenbau", St. Fronius et al, vol. 1/II Grundlagen, 1965, p. 396.

*Primary Examiner*—Douglas C. Butler
*Attorney, Agent, or Firm*—Walter Ottesen

[57] ABSTRACT

An air spring for vehicles includes an elastomeric air-spring flexible member. The air-spring flexible member is sealed off by attachment parts at both ends thereof. The flexible member can be attached via the attachment parts to the vehicle parts which are to be resiliently supported with respect to each other. For this purpose, at least one attachment part includes projecting attachment bolts or embedded attachment bushings. To minimize leaks caused by attachment parts which become damaged, the projecting attachment bolts or the embedded attachment bushings are arranged within respective recesses in the end-face outer surface of the attachment part.

9 Claims, 3 Drawing Sheets

AIR SPRING HAVING AN ELASTOMERIC AIR-SPRING FLEXIBLE MEMBER

FIELD OF THE INVENTION

The invention relates to an air spring for vehicles. The air spring has an elastomeric air-spring flexible member which is sealed tightly at both ends thereof by respective attachment parts. The air spring is attached to the vehicle parts which are to be spring-connected to each other and, for this purpose, at least one attachment part has projecting attachment bolts or embedded attachment bushings.

BACKGROUND OF THE INVENTION

Air-spring flexible members are sealed at their two open ends by means of attachment parts and are attached via these parts to the vehicle. Various types of sealing connections are known in order to obtain a tight seat of the ends of the air-spring flexible member on the attachment parts. The attachment parts can have conical sealing seats on which the air-spring flexible member is seated with corresponding conical sealing beads. Beadless air-spring flexible members are mounted with clamping rings to the attachment parts. Air-spring flexible members having sealing beads which can be clamped are tightly clamped to an attachment part configured as a flange plate by bending over the edge of the plate. Air-spring flexible members having clampable sealing beads and beadless air-spring flexible members are supplied to the vehicle manufacturer with the attachment parts mounted.

The air-spring flexible members complete with the attachment parts are built in between the vehicle frame and the vehicle axles with the upper attachment part being usually configured as an attachment plate having projecting attachment bolts. The upper attachment part is connected to a support member of the vehicle frame. The attachment bolts are welded with their bolt heads to the inner surface of the attachment plate. It is also possible to provide the attachment plate with embedded bushings, for example, welded bushings in which threaded bolts are threadably engaged when the vehicle is assembled.

Air springs having a flexible member made of elastomeric material have proven successful for many decades as a load controllable spring element in the manufacture of vehicles. Notwithstanding this positive performance of the air springs, efforts are undertaken in order to increase the service life and the safety during use of the air springs. For this purpose, attention is mostly directed to the development of special elastomeric materials.

New investigations have shown that a further reason for possible leakage of the air springs in long-service operations can also be the attachment parts. It was determined that the effects on service life were in the area of the attachment of the attachment part to the particular vehicle part. In the area of the bolt head of the attachment bolts, a stress concentration results because of the cross-section interface which, for the dynamic load of the attachment part, greatly reduces the durability of the attachment region because of the spring operation. For this dynamic loading, the arcuate deflections cause movements and slight lift-off actions of the plate-shaped attachment part with respect to the vehicle frame support member to which the air spring is attached. If the stationary bolt head or the embedded bushing are also welded, the disadvantageous consequence of stress concentration is further increased because of the weld influence zone so that a fatigue fissure can develop in this zone. This fatigue fissure runs from the weld seam into the attachment plate causing leakage to occur.

SUMMARY OF THE INVENTION

It is an object of the invention to provide an air spring of the kind described above which is so configured that leakage occurring when attachment parts become damaged is minimized.

According to a feature of the invention, the projecting attachment bolts or the embedded attachment bushings are arranged each within a recess in the end-face outer surface of the attachment part. The dynamic forces are no longer conducted into the attachment region because of the recess around the attachment bolt or attachment bushing. The dynamic load is taken up in the contact location between the attachment part and the vehicle part with the contact location being disposed forward of the recess. The attachment region is then only statically loaded by the pretensioning. The dynamic forces are conducted directly into the support member of the vehicle frame by means of the arrangement of the invention of a recess disposed around the attachment bolt or the attachment bushing.

The introduced dynamic load is taken up by the support member forward of the bolt connection or screw connection because a contact location between the attachment part and the support member is provided with a recess separating the contact location from the bolt connection or screw connection. In this way, the dynamic durability of the attachment is significantly improved since the formation of fissures in the attachment region is significantly minimized.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
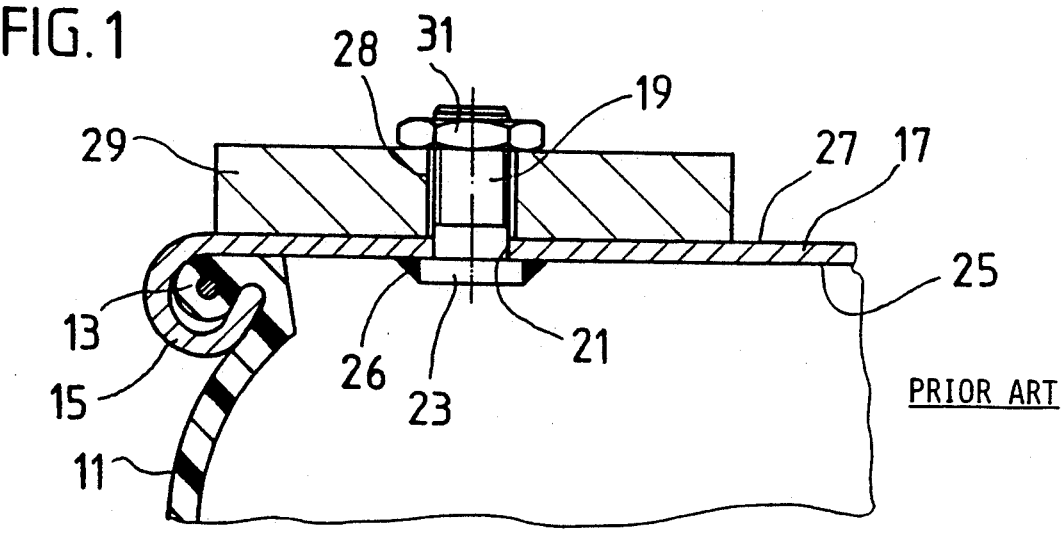
FIG. 1 is a side elevation view, in section, showing a bolt connection of an attachment part to a support member of a vehicle frame according to the state of the art with the attachment part being configured as a flange plate.

In FIG. 1, an air-spring flexible member 11 is shown having a clamped bead 13 which is surrounded by a bent-over edge 15 of an upper attachment part configured as a flange plate with the bead 13 being clamped so as to be seal-tight. Attachment bolts 19 having outer threads are shown mounted in the flange plate 17. These attachment bolts 19 project through respective bores 21 of appropriate size in the flange plate and have a diameter substantially greater than the thickness of the flange plate as shown. The attachment bolts 19 lie with their bolt heads 23 against the inner wall surface 25 of the flange plate 17 and are attached there by means of a peripheral weld seam 26. The attachment bolts 19 project outwardly at the end-face outer surface 27 of the flange plate 17. These attachment bolts 19 are inserted through pass-through bores 28 of a vehicle-frame support member and are secured by a nut 31 thereby providing the attachment to the vehicle frame.

Arcuate deflections of the flange plate 17 occur because of the dynamic load and this dynamic load can lead to a lift-off levering action at the bolt head 23 because the attachment bolts 19 are mounted tightly in the vehicle-frame support member 29. For this reason, a significant dynamic load is produced in the flange plate 17 at the bolt head 23. This region is endangered by the stress concentration of the cross-section interface and additionally by the weld influence zone. For this reason, the unwanted fissures can form at the end of the weld seam 26.

Figure 2:
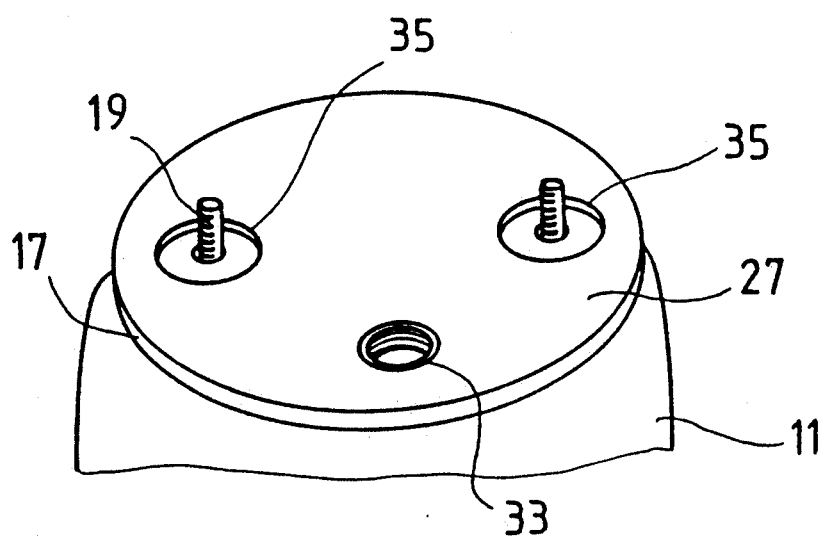
FIG. 2 is a perspective plan view showing a portion of an elastomeric air-spring flexible member which is closed in a seal-tight manner by an attachment configured as a flange plate having projecting attachment bolts surrounded by respective recesses.

A portion of the elastomeric air-spring flexible member is shown in FIG. 2 and is likewise tightly clamped to an attachment part configured as a flange plate 17. The flange plate 17 has two projecting attachment bolts 19 as well as a threaded opening 33 for the air connection.

A circularly-shaped, trough-like recess 35 of approximately 0.5 mm is formed in the end-face outer surface 27 of the flange plate 17 around each of the projecting attachment bolts 19.

Figure 3:
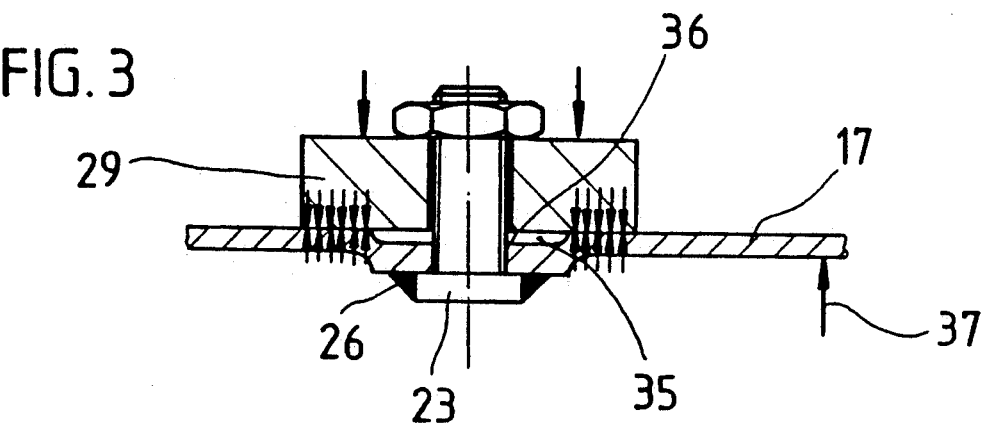
FIG. 3 is a bolt connection of the flange plate of FIG. 2 to a vehicle support member.

In FIG. 3, an attachment location is shown between flange plate 17 and the vehicle-frame support member 29. The support member 29 and the flange plate 17 do not lie in contact engagement with each other up to the attachment bolt 19. A contact location between the flange plate 17 and support member 29 is provided outside of the recess 35. The area pressure occurring at this contact location takes up the dynamic forces. The region of the bolt head 23 and the weld influence zone 26 remain substantially free of dynamic loads.

Figure 5:
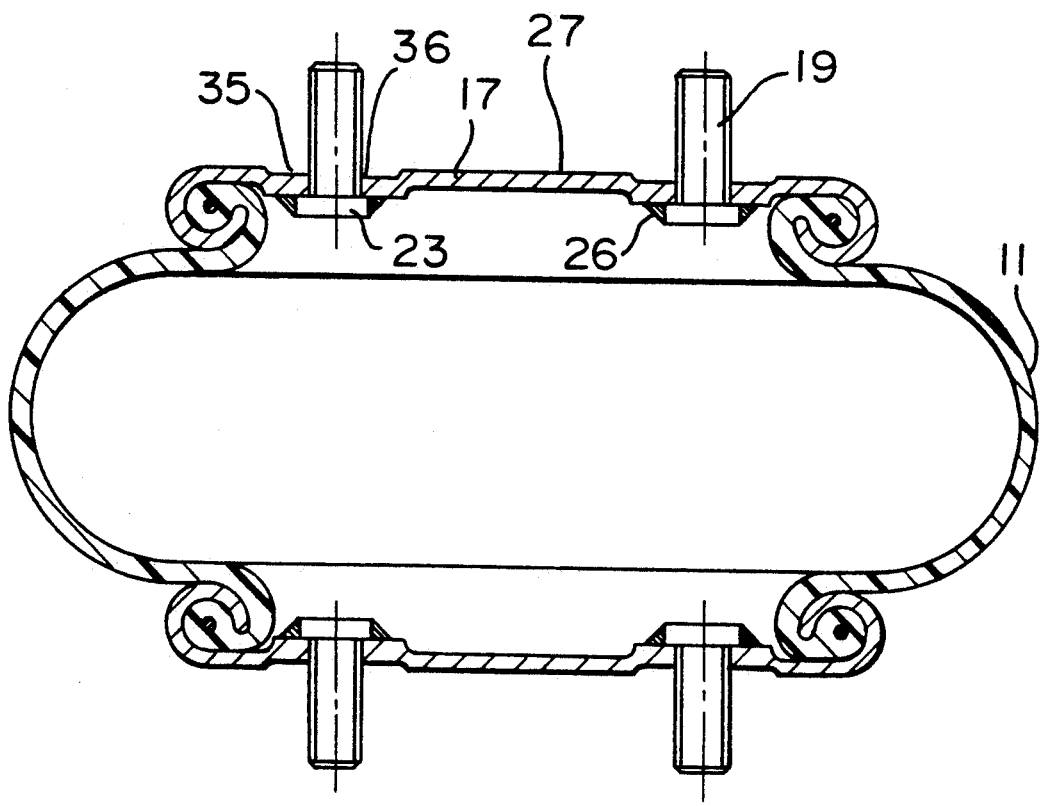
FIG. 5 is a side elevation view, in section, of a complete air spring incorporating the bolt connection of FIG. 3.

Each of the attachment bolts 19 is only statically loaded. When the threaded connection is tightened, a resilient yielding of the inner edge 36 of the recess 35 can take place which leads to a contact engagement of the inner periphery 36 or the inner edge of the recess 35 on the support member 29. The dynamic load (arrow 37) is not conducted up to the region of the bolt because a recessed annular space is still provided around the bolt connection. A complete air spring incorporating a plurality of said bolts is shown in FIG. 5.

Figure 4:
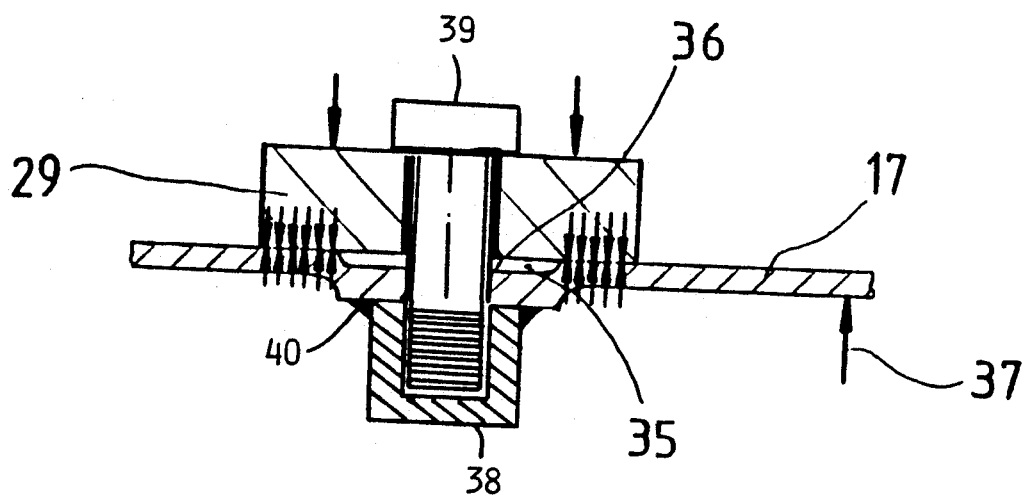
FIG. 4 is a connection which includes a threaded bushing attached to the flange plate.

In lieu of a threaded bolt, the flange plate 17 can be provided with an attachment bushing 38 as shown in FIG. 4. The attachment bushing 38 is provided with an internal thread to receive a bolt 39 as shown. A weld seam 40 holds the attachment bushing securely on the attachment plate 17.

It is understood that the foregoing description is that of the preferred embodiments of the invention and that various changes and modifications may be made thereto without departing from the spirit and scope of the invention as defined in the appended claims.

What is claimed is:

1. An air spring for interconnecting elements of a vehicle, the air spring comprising:
   an elastomeric air-spring flexible member having two open ends;
   at least one bendable plate connected to said flexible member at one of said open ends thereof for sealing off said flexible member at said open end to define a space for holding air under pressure;
   said one plate having an outer surface facing away from said air chamber;
   mounting means for mounting said one plate at said outer surface thereof in surface-to-surface contact engagement with one of the elements of the vehicle thereby causing said one plate to be subjected to dynamic and static loads during operation of the motor vehicle;
   said mounting means including an elongated fastener member having a predetermined diameter and a receiving member for tightly engaging said elongated member to thereby clamp said one plate to said element;
   said one plate having a thickness less than said diameter and being adapted to arcuately deflect under said dynamic load;
   means for fixedly attaching one of said members to said one plate; and,
   recess means formed in said outer surface of said one plate to interrupt said surface-to-surface contact at and in surrounding relationship to said one member so as to place said one member completely in the region of said recess thereby keeping said region and said mounting means substantially free of said dynamic load.

2. The air spring of claim 1, said recess means having a trough-like configuration and having a base defining a base surface of constant depth.

3. The air spring of claim 2, said constant depth being in the range of 0.3 mm to 0.7 mm.

4. The air spring of claim 1, said recess means having an inclined base wall.

5. The air spring of claim 1, said recess means having a circular configuration.

6. The air spring of claim 1, said elongated fastener member being a threaded bolt projecting upwardly from said outer surface of said one plate and said receiving member being a threaded nut.

7. The air spring of claim 1, said receiving member being an attachment bushing arranged on said one plate.

8. The air spring of claim 1, said mounting means including a plurality of said one member forming part of said one plate and being adapted to make respective connections to said one element of said vehicle; said recess means including a plurality of recesses formed in said outer surface of said one plate so as to place said members within respective ones of said recesses.

9. The air spring of claim 1, said means for fixedly attaching said one member being a weld.

* * * * *